US012340742B2

(12) United States Patent
Yu et al.

(10) Patent No.: US 12,340,742 B2
(45) Date of Patent: Jun. 24, 2025

(54) DISPLAY DRIVING CIRCUIT, METHOD FOR DRIVING DISPLAY PANEL, AND DISPLAY DEVICE FOR OPTIMIZING FLICKER PREVENTION

(71) Applicants: Chengdu BOE Optoelectronics Technology Co., Ltd., Sichuan (CN); BOE Technology Group Co., Ltd., Beijing (CN); Beijing BOE Technology Development Co., Ltd., Beijing (CN)

(72) Inventors: Yong Yu, Beijing (CN); Hao Sun, Beijing (CN)

(73) Assignees: Chengdu BOE Optoelectronics Technology Co., Ltd., Sichuan (CN); BOE Technology Group Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/576,718

(22) PCT Filed: Apr. 28, 2023

(86) PCT No.: PCT/CN2023/091464
§ 371 (c)(1),
(2) Date: Jan. 4, 2024

(87) PCT Pub. No.: WO2024/221384
PCT Pub. Date: Oct. 31, 2024

(65) Prior Publication Data
US 2025/0095566 A1 Mar. 20, 2025

(51) Int. Cl.
*G09G 3/3225* (2016.01)

(52) U.S. Cl.
CPC ....... *G09G 3/3225* (2013.01); *G09G 2310/08* (2013.01); *G09G 2320/0247* (2013.01)

(58) Field of Classification Search
CPC .................................................... G09G 3/3225
See application file for complete search history.

(56) References Cited

U.S. PATENT DOCUMENTS

2021/0256927 A1 8/2021 Yang et al.
2023/0237961 A1* 7/2023 Zheng ................. G09G 3/2088 345/55

FOREIGN PATENT DOCUMENTS

CN 109377952 A 2/2019
CN 109410861 A 3/2019
(Continued)

*Primary Examiner* — Gustavo Polo
(74) *Attorney, Agent, or Firm* — IPro, PLLC

(57) ABSTRACT

A display driving circuit, a method for driving a display panel, and a display device are provided, relating to display technologies. The display driving circuit includes a first display driving circuit, a second display driving circuit, a power circuit and a TCON circuit. The first display driving circuit is configured to send a first control signal to the second display driving circuit in response to that a level of the first power signal sent by the power circuit reaches a second level, and send a second control signal to the second display driving circuit in response to that a level of the communication indication signal sent by the TCON circuit reaches a fourth level; the second display driving circuit is configured to: turn off the plurality of pixels in response to the first control signal, and drive the plurality of pixels in response to the second control signal in the state of completing initialization.

20 Claims, 8 Drawing Sheets

(56) References Cited

FOREIGN PATENT DOCUMENTS

| | | | |
|---|---|---|---|
| CN | 110264971 | A | 9/2019 |
| CN | 113936602 | A | 1/2022 |
| CN | 113936603 | A | 1/2022 |
| KR | 20150076032 | A | 7/2015 |
| KR | 20210060912 | A | 5/2021 |

* cited by examiner

DISPLAY DRIVING CIRCUIT, METHOD FOR DRIVING DISPLAY PANEL, AND DISPLAY DEVICE FOR OPTIMIZING FLICKER PREVENTION

The present application is a National Stage of International Application No. PCT/CN2023/091464 filed on Apr. 28, 2023, the contents of which are incorporated herein by reference in its entirety.

TECHNICAL FIELD

The present disclosure relates to the field of display technologies, and in particular, to a display driving circuit, a method for driving a display panel, and a display device.

BACKGROUND

A display device generally includes a display driving circuit, a gate driver circuit and a plurality of rows of pixels. The display driving circuit is electrically connected to the gate driver circuit, and the gate driver circuit is electrically connected to the plurality of rows of pixels. The display driving circuit is configured to transmit a driving signal to the gate driver circuit, so that the gate driver circuit performs progressive scanning on the plurality of rows of pixels.

A display driving circuit includes a timing controller (TCON) circuit, a source driver circuit (Source IC), and a power circuit. The power circuit is electrically connected to the TCON circuit and the source IC, and is configured to supply power to the TCON circuit and the source IC. The source IC is electrically connected to the TCON circuit and the gate driver circuit, to control the gate driver circuit based on a timing signal output by the TCON circuit, and the source IC is further configured to provide driving signals for the plurality of pixels based on the power supplied by the power circuit.

However, there is a big difference between the starting time of the TCON circuit and the starting time of the source IC in the display driving circuit, which results in a poor display effect of the display device.

SUMMARY

The present disclosure provides a display driving circuit, a method for driving a display panel, and a display device. The technical solutions are as follows.

According to an aspect of the present disclosure, a display driving circuit is provided. The display driving circuit is applicable to a display panel, and the display panel includes a plurality of pixels. The display driving circuit includes:

- a first display driving circuit, a second display driving circuit, a power circuit and a timing controller (TCON) circuit; wherein
- the first display driving circuit is electrically and respectively connected to the power circuit and the TCON circuit, the power circuit is configured to send a first power signal to the first display driving circuit, and the TCON circuit is configured to send a communication indication signal to the first display driving circuit;
- the first display driving circuit is electrically connected to the second display driving circuit, and the first display driving circuit is configured to send a first control signal to the second display driving circuit in response to that a level of the first power signal changes from a first level to a second level, and send a second control signal to the second display driving circuit in response to that a level of the communication indication signal changes from a third level to a fourth level;
- the second display driving circuit is electrically connected to the plurality of pixels, and the second display driving circuit is configured to turn off the plurality of pixels based on the first control signal, and drive the plurality of pixels based on the second control signal.

Optionally, the first display driving circuit comprises a comparator circuit and a source driver chip, the comparator circuit being electrically connected to the power circuit and the source driver chip; wherein

- the comparator circuit is configured to, when detecting that the level of the first power signal output by the power circuit reaches the second level, generate a first indication signal and output the first indication signal to the source driver chip; and
- the source driver chip is configured to send the first control signal to the second display driving circuit based on the first indication signal.

Optionally, the first display driving circuit comprises a comparator circuit and a source driver chip, the comparator circuit being electrically connected to the TCON circuit and the source driver chip; wherein

- the comparator circuit is configured to, when detecting that the level of the communication indication signal output by the TCON circuit reaches the fourth level, generate a second indication signal and output the second indication signal to the source driver chip; and
- the source driver chip is configured to send the second control signal to the second display driving circuit based on the second indication signal.

Optionally, the TCON circuit is further configured to send a first driving timing signal to the first display driving circuit; and

- the first display driving circuit is configured to, in response to that the level of the communication indication signal changes from the third level to the fourth level, stop sending the first control signal to the second display driving circuit, and send a second driving timing signal to the second display driving circuit based on the first driving timing signal, wherein a high level voltage value of the second driving timing signal is greater than a high level voltage value of the first driving timing signal, and the second driving timing signal is the second control signal.

Optionally, the power circuit comprises a first power circuit and a second power circuit; wherein

- the first power circuit is coupled to the first display driving circuit, the first power circuit is configured to send an analog power signal to the first display driving circuit, and the first display driving circuit is configured to send data signals to the plurality of pixels based on the analog power signal;
- the second power circuit is electrically connected to the plurality of pixels, and the second power circuit is configured to send driving power signals to the plurality of pixels;
- the plurality of pixels is configured to emit light based on the data signals and the driving power signals.

Optionally, a level of the first control signal is the same as a level of the analog power signal.

Optionally, the pixel comprises a light-emitting device and a first transistor; wherein

- the second display driving circuit is electrically connected to a gate of the first transistor, a first electrode of the first transistor is electrically connected to the first display driving circuit, and a second electrode of the first transistor is electrically connected to the second power circuit.

Optionally, the second level is higher than the first level, and the fourth level is higher than the third level.

According to another aspect of the present disclosure, a method for driving a display panel is provided. The method is applicable to the first display driving circuit in the display driving circuit as described in the above aspect. The method includes:

sending a first control signal to a second display driving circuit in response to that a first power signal sent by a power circuit changes from a first level to a second level; and sending a second control signal to the second display driving circuit in response to that a communication indication signal sent by a timing controller (TCON) circuit changes from a third level to a fourth level;

wherein the first control signal instructs the second display driving circuit to control the plurality of pixels to be turned off, and the second control signal instructs the second display driving circuit to drive the plurality of pixels.

Optionally, sending the first control signal to the second display driving circuit in response to that the first power signal sent by the power circuit changes from the first level to the second level comprises:

detecting whether the level of the first power signal sent by the power circuit changes from the first level to the second level;

generating a first indication signal in response to that a level of the first power signal sent by the power circuit reaches the second level; and sending the first control signal to the second display driving circuit based on the first indication signal.

Optionally, sending the second control signal to the second display driving circuit in response to that the communication indication signal sent by the TCON circuit changes from the third level to the fourth level comprises:

detecting whether a communication indication signal output by the TCON circuit changes from the third level to the fourth level;

generating a second indication signal in response to that the level of the communication indication signal output by the TCON circuit reaches the fourth level; and sending the second control signal to the second display driving circuit based on the second indication signal.

Optionally, sending the second control signal to the second display driving circuit based on the second indication signal comprises:

receiving a first driving timing signal sent by the TCON circuit based on the second indication signal; and sending a second driving timing signal to the second display driving circuit based on the first driving timing signal, wherein a high level voltage value of the second driving timing signal is greater than a high level voltage value of the first driving timing signal.

According to still another aspect of the present disclosure, a display device is provided. The display device includes a display panel and a display driving circuit. The display driving circuit is electrically connected to the display panel, and the display driving circuit is the display driving circuit of the display panel as described above.

According to still another aspect of the present disclosure, a computer program product or a computer program is provided. The computer program product or the computer program includes computer instructions which are stored in a computer-readable storage medium. A processor of a computer device reads the computer instructions from the computer-readable storage medium, and the processor executes the computer instructions to cause the computer device to implement the method for driving the display panel described above.

BRIEF DESCRIPTION OF DRAWINGS

For a clearer description of the technical solutions in the embodiments of the present disclosure, the following briefly introduces the accompanying drawings required for describing the embodiments. The accompanying drawings in the following descriptions show merely some embodiments of the present disclosure, and persons of ordinary skill in the art may still derive other drawings from these accompanying drawings without creative effort.

Figure 1:
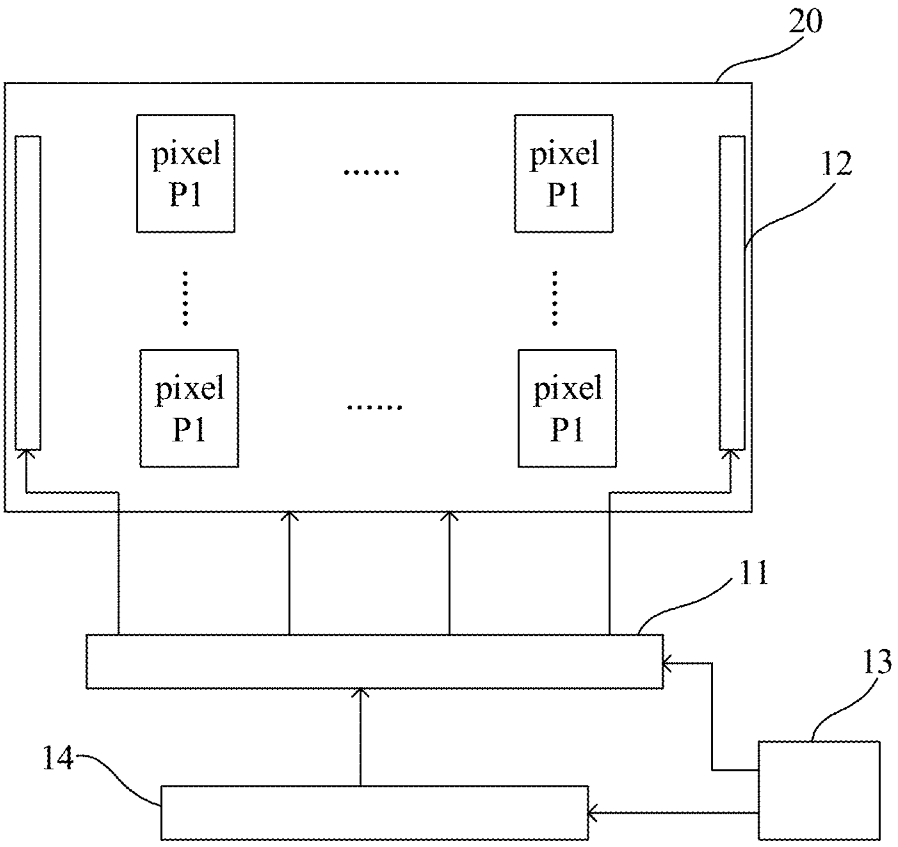
FIG. 1 is a schematic structural diagram of a display driving circuit according to some embodiments of the present disclosure.

Specific embodiments of the present disclosure have been shown by the above figures, and will be described in more detail hereinafter. These drawings and text descriptions are not intended to limit the scope of the present disclosure in any way, but are intended to illustrate the concept of the present disclosure to those skilled in the art by reference to the specific embodiments.

DETAILED DESCRIPTION

To make the objectives, technical solutions and advantages of the present disclosure clearer, the embodiments of the present disclosure will be further described in detail below with reference to the accompanying drawings.

Currently, in active-matrix organic light-emitting diode (AMOLED) display products, a gate driver circuit is used to perform progressive scanning and driving on a plurality of rows of pixels in the display panel, so that the display panel displays. Currently, since the gate driver circuit is mainly integrated on an array substrate in the display panel, the gate driver circuit is also referred to as a gate driver on array (GOA) circuit. For example, the gate driver circuit may be electrically connected to a display driving circuit disposed on the periphery of the display panel, and may be electrically connected to the plurality of rows of pixels in one-to-one correspondence by a plurality of gate lines. The gate driver circuit is configured to receive a plurality of driving signals transmitted by the display driving circuit, and to sequentially apply, under the driving of the plurality of driving signals, turn-on voltages for controlling the operation of the pixel circuits in the pixels or turn-off voltages for controlling the non-operation of the pixel circuits in the pixels to the plurality of gate lines, so that the plurality of rows of pixel circuits are turned on row by row. The pixel circuit further transmits a light emission driving voltage to the light-emitting element in the pixel to drive the light-emitting element to emit light, that is, to turn on the light-emitting element. The turn-on voltage and turn-off voltage are referred to as gate driving signals. It can also be determined that the turn-on or turn-off of the pixel circuits in each row of pixels is mainly implemented by the turn-on voltage or turn-off voltage applied by the gate driver circuit to the gate lines electrically connected to the pixel circuits, and the turn-on voltage is also referred to as a row turn-on voltage.

The display driving circuit includes a TCON circuit, a source IC and a power circuit. The power circuit is electrically connected to the TCON circuit and the source IC, and is configured to supply power to the TCON circuit and the source IC. The source IC is electrically connected to the TCON circuit and the gate driver circuit, to control the gate driver circuit based on the timing signal output by the TCON circuit, and the source IC is further configured to provide driving signals for the plurality of pixels based on the power supplied by the power circuit.

However, there is a big difference between the starting time of the TCON circuit and the starting time of the source IC in the above display driving circuit. That is, after the power circuit supplies power to the TCON circuit and the source IC, the TCON circuit performs an initialization process for a period of time. During the initialization process, the TCON circuit cannot normally output the timing control signals to the source IC, and thus the source IC cannot control the gate driver circuit. In this case, the source IC may send unstable signals which includes unordered high-level signals or unordered low-level signals to the gate driver circuit, and thus the gate driver circuit may be in an uncontrollable state. As a result, the pixels electrically connected to the gate driver circuit are also in an abnormal operating state, and the display picture currently displayed on the display panel flickers, resulting in a poor display effect of the display device.

The embodiments of the present disclosure provide display driving circuit, a method for driving a display panel, and a display device, which can solve the problem in the related art.

FIG. 1 is a schematic structural diagram of a display driving circuit 10 according to some embodiments of the present disclosure. Referring to FIG. 1, the display driving circuit 10 is applied to a display panel 20, and the display panel 20 includes a plurality of pixels P1. The display driving circuit 10 includes a first display driving circuit 11, a second display driving circuit 12, a power circuit 13, and a TCON circuit 14. The first display driving circuit 11 includes a source IC, and the second display driving circuit 12 includes a gate driver circuit.

The first display driving circuit 11 is electrically connected to the power circuit 13 and the TCON circuit 14, and the power circuit 13 is configured to send a first power signal to the first display driving circuit 11. The first power signal is an analog power signal (AVDD), and the first display driving circuit 11 sends data signals (Vdata) to the plurality of pixels P1 based on the analog power signal (AVDD). The TCON circuit 14 is configured to send a communication indication signal (BCLD) to the first display driving circuit 11. The communication indication signal (BCLD) is an indicator bit of normal communication between the TCON circuit 14 and the first display driving circuit 11. That is, when the communication indication signal (BCLD) is at a high level, it means that the TCON circuit 14 can send a normal timing control signal to the source IC.

The first display driving circuit 11 is electrically connected to the second display driving circuit 12, and the first display driving circuit 11 is configured to send a first control signal to a second display driving circuit 12 when the level of the first power signal changes from the first level to a second level. The second display driving circuit 12 is electrically connected to the plurality of pixels P1, and the second display driving circuit 12 is configured to turn off the plurality of pixels P1 based on the first control signal.

When the level of the first power signal changes from the first level to the second level, it means that the power circuit 13 has sent the first power signal to the first display driving circuit 11, and the first display driving circuit 11 may send the data signals (Vdata) to the plurality of pixels P1 based on the first power signal. Therefore, in this case, the second display driving circuit 112 is in an uncontrollable state, and the second display driving circuit 12 may send low-level signals or high-level signals to the plurality of pixels P1. The high-level signal and the low-level signal each may be one of a turn-off signal and a turn-on signal, respectively. When the second display driving circuit 12 sends the turn-on signals to the plurality of pixels P1, the plurality of pixels P1 emit light under the action of the turn-on signals and the data signals (Vdata), resulting in the screen flicker phenomenon of the display panel 20. Therefore, the first control signal may be sent to the second display driving circuit 12 through the first display driving circuit 11, so that the second display driving circuit 12 sends turn-off signals to the plurality of pixels P1 based on the first control signal to turn off the plurality of pixels P1, and thereby the display panel 20 is in a black screen state.

Furthermore, the first display driving circuit 11 is further configured to send a second control signal to the second display driving circuit 12 when the level of the communication indication signal changes from a third level to a fourth level, and the second display driving circuit 12 is configured to drive the plurality of pixels P1 based on the second control signal. When the level of the first power signal changes from the third level to the fourth level, it means that the TCON circuit 14 has currently completed the initialization, and the TCON circuit 14 can send a normal timing control signal to the first display driving circuit 11. In this case, the first display driving circuit 11 may send the data signals (Vdata) to the plurality of pixels P1 based on the first power signal. Therefore, the second control signal may be sent to the second display driving circuit 12 through the first display driving circuit 11, such that the second display driving circuit 12 sends the driving signals (the driving signals include timing turn-on signals and turn-off signals) to the plurality of pixels PT based on the second control signal to drive the plurality of pixels P1 to emit light normally, and thereby the display panel 20 is in a normal display state.

In summary, the embodiments of the present disclosure provide a display driving circuit including a first display driving circuit, a second display driving circuit, a power circuit and a TCON circuit. The first display driving circuit can turn off the plurality of pixels in the display panel through the second display driving circuit when the level of the first power signal reaches the second level; and the first display driving circuit can further drive the plurality of pixels in the display panel through the second display driving circuit when the level of the communication indication signal reaches the fourth level. In this way, when the TCON circuit is in the initialization state, the first display driving circuit can turn off the plurality of pixels through the second display driving circuit, to avoid flickering of the display panel under the control of unstable signals output from the TCON circuit. Additionally, when the TCON circuit is in the state of completing initialization, the first display driving circuit can drive the plurality of pixels through the second display driving circuit, so that the display panel normally displays. Therefore, the problem of the poor display effect of the display device in the related art can be solved, and the display effect of the display device can be improved.

It should be noted that, in the embodiments of the present disclosure, the first level and the second level are two levels with different voltage values, and the third level and the fourth level are two levels with different voltage values. The specific voltage values of the first level, the second level, the third level and the fourth level are not limited in the embodiments of the present disclosure.

Figure 2:
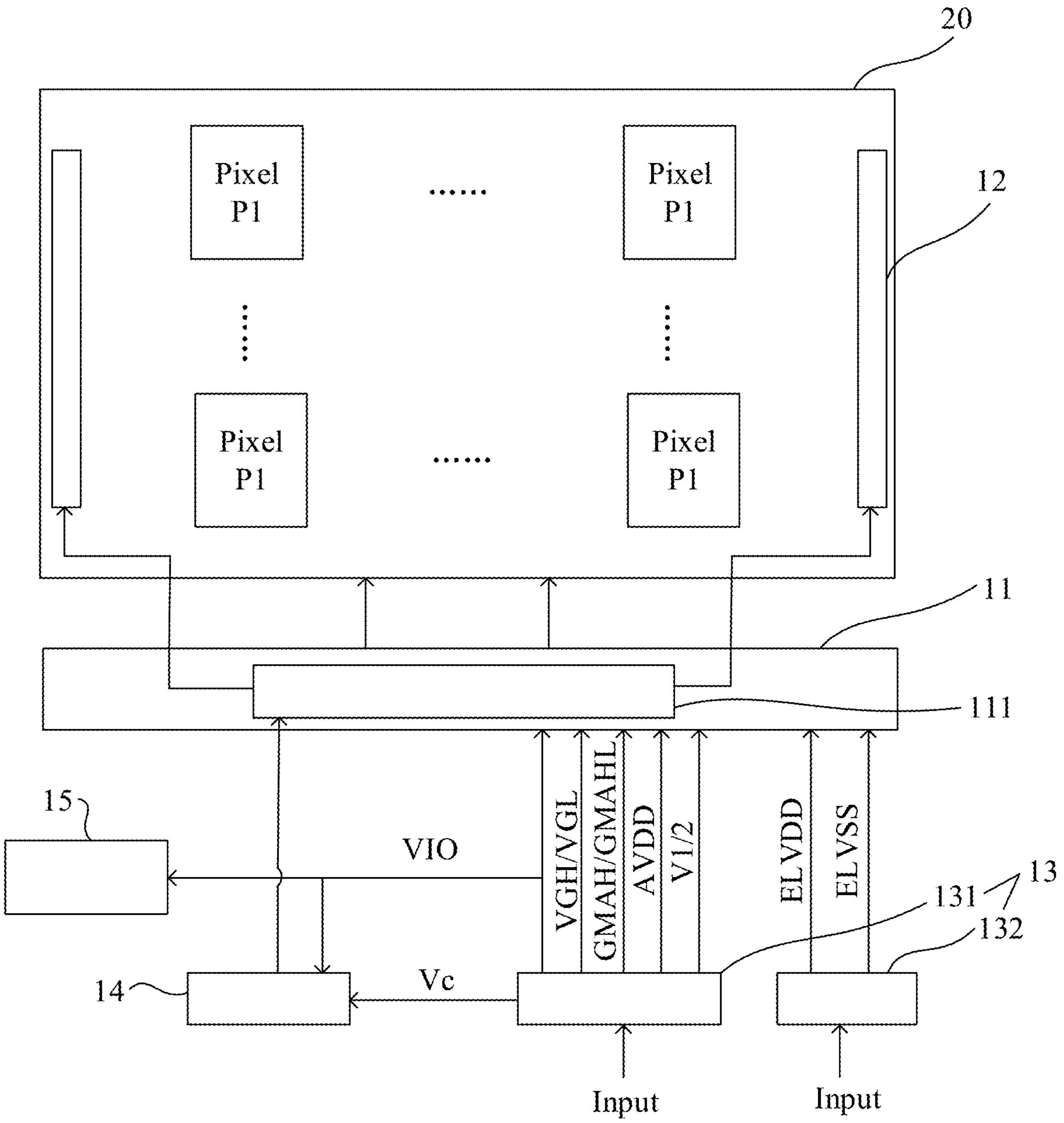
FIG. 2 is a schematic structural diagram of another display driving circuit according to some embodiments of the present disclosure.

FIG. 2 is a schematic structural diagram of another display driving circuit 10 according to some embodiments of the present disclosure. Referring to FIG. 2, in an optional implementation, the TCON circuit 14 is further configured to send a first driving timing signal to the first display driving circuit 11. The first display driving circuit 11 is configured to stop sending the first control signal to the second display driving circuit 12 when the level of the communication indication signal changes from the third level to the fourth level, and to send a second driving timing signal to the second display driving circuit 12 based on the first driving timing signal. The high level voltage value of the second driving timing signal is greater than the high level voltage value of the first driving timing signal, and the second driving timing signal is the second control signal.

That is, the TCON circuit 14 is configured to send the first driving timing signal and display data to the first display driving circuit 11. The first driving timing signal is gate driving timing data. The first display driving circuit 11 is configured to send the second driving timing signal to the second display driving circuit 12 based on the first driving timing signal. The second driving timing signal is a gate driving timing signal. The first display driving circuit 11 further sends display driving data to the display panel 20. The first driving timing signal includes the configuration information of the gate driving timing signal, and the configuration information includes at least one of a duty cycle, a rising edge slope, a high level voltage value, a frequency, and signal duration. In the embodiments of the present disclosure, the first driving timing signal includes a light emission control signal (EMGOA) and a gate control signal (GATEGOA). The light emission control signal (EMGOA) includes a first start signal (ESTV) and first clock signals (ECB and ECK), and the gate control signal (GATEGOA) includes a second start signal (GSTV) and second clock signals (GCB and GCK).

The first display driving circuit 11 includes a level shift (LS) circuit and a source driver chip 113. The level shift circuit 111 is integrated within the source driver chip 113. An input terminal of the level shift circuit 111 is electrically connected to the TCON circuit 14, and an output terminal of the level shift circuit 111 is electrically connected to the second display driving circuit 12. The first display driving circuit 11 converts the display data into an analog voltage and sends the analog voltage to the display panel 20. The first display driving circuit 11 further increases the level of the first driving timing signal through the level shift circuit 111 and sends the first driving timing signal to the display panel 20.

Figure 3:
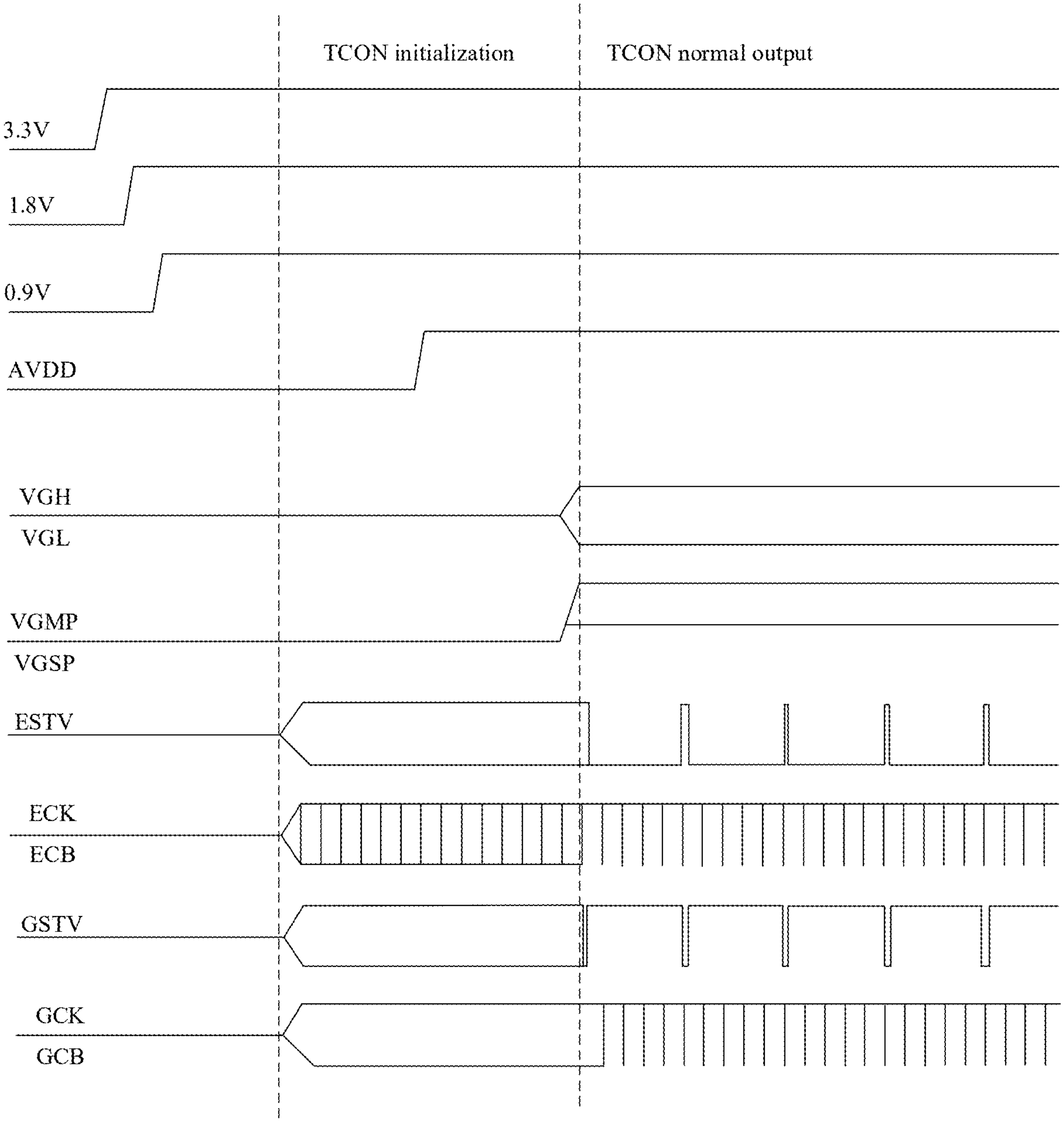
FIG. 3 is a power-on timing diagram of a display driving circuit in the related art.
Figure 4:
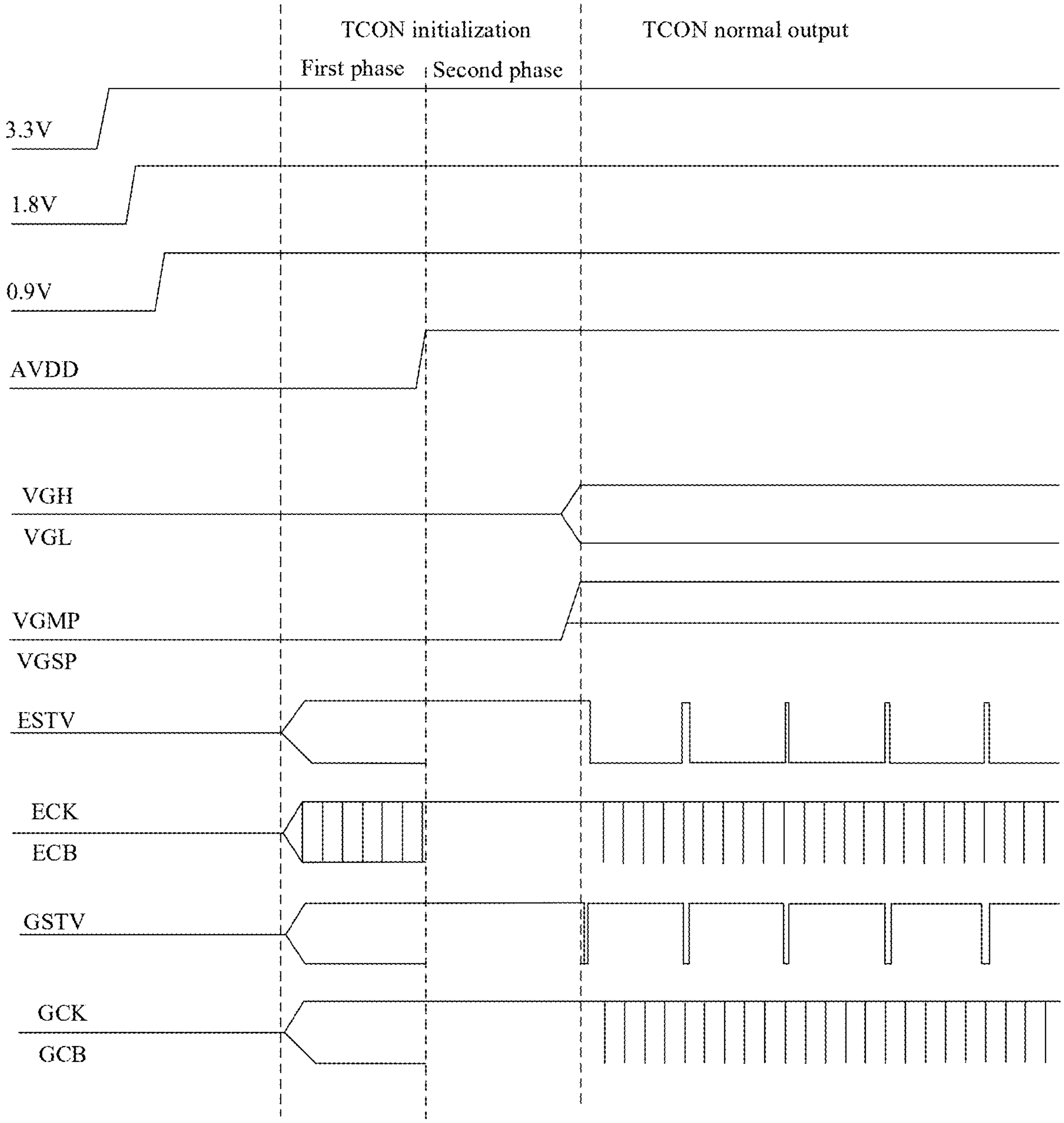
FIG. 4 is a power-on timing diagram of a display driving circuit according to some embodiments of the present disclosure.

FIG. 3 is a power-on timing diagram of a display driving circuit 10 in the related art, and FIG. 4 is a power-on timing diagram of a display driving circuit 10 according to some embodiments of the present disclosure. Referring to FIG. 2, FIG. 3 and FIG. 4, optionally, the power circuit 13 includes a first power circuit 131 (PMIC) and a second power circuit 132 (ELIC). The first power circuit 131 is electrically connected to the first display driving circuit 11, and the first power circuit 131 is configured to transmit an analog power signal (AVDD) to the first display driving circuit 11. The first display driving circuit 11 is configured to transmit data signals (Vdata) to the plurality of pixels P1 based on the analog power signal (AVDD). The second power circuit 132 is electrically connected to the plurality of pixels P1, and the second power circuit 132 is configured to transmit driving power signals (ELVDD) to the plurality of pixels P1. The plurality of pixels P1 are configured to emit light based on the data signals (Vdata) and the driving power signals (ELVDD).

The first power circuit 131 may further supply device interface power (VDDIO) to the first display driving circuit 11 and the TCON circuit 14, and supply a high level output signal (VGH), a low level output signal (VGL), a first reference voltage (VGMP), a second reference voltage (VGSP), a first initial signal (Vint1; V1 in short), and a second initial signal (Vint2; V2 in short) to the first display driving circuit 11.

As can be seen from FIG. 2 and FIG. 3, during the power-on process of the display driving circuit 10, power (3.3 V) is first supplied externally to the first power circuit 131, and at this time, the first power circuit 131 provides an operating voltage (Vcore, Vc for short, 0.9 V) and an interface voltage (VIO, 1.8 V) for the TCON circuit 14. The TCON circuit 14 is provided with a register 15, which stores the configuration data of the TCON circuit 14. The initialization process of the TCON circuit 14 includes the following two phases. The first phase is a process from the start of the output to the stable output of the operating voltage (Vcore) and the interface voltage (IO), which lasts for about 100 ms. The second phase is a process in which the TCON circuit 14 downloads the configuration data stored in the register 15 from the register and initializes the configuration according to the configuration data, after the voltage on the TCON circuit 14 becomes stable, which lasts for about 50 ms. After the TCON circuit 14 is initialized after the above two phases, the TCON circuit 14 sends the first driving timing signal to the level shift circuit 111 in the first display driving circuit 11. That is, after receiving the two voltages output by the first power circuit, the TCON circuit 14 needs to be initialized for 150 ms in order to normally output the first driving timing signal. However, in this process, the level of the first power signal provided by the power circuit 13 to the first display driving circuit 11 has changed from the first level to the second level, and the first power signal is an analog power signal (AVDD), that is, the level of the analog power signal (AVDD) provided by the first power circuit 131 to the first display driving circuit 11 has changed from the low level to the high level. Therefore, the first power circuit 131 can normally transmit the analog power signal (AVDD) to the first display driving circuit 11, and the first display driving circuit 11 is configured to transmit the data signals (Vdata) to the plurality of pixels P1 based on the analog power signal (AVDD). The second display driving circuit is in an uncontrollable state, and the second display driving circuit may send low-level signals or high-level signals to the plurality of pixels P1. The high-level signal and the low-level signal each may be one of a turn-off signal and a turn-on signal, respectively. When the second display driving circuit sends the turn-on signals to the plurality of pixels P1, the plurality of pixels P1 may emit light under the action of the turn-on signals and the data signals (Vdata), resulting in the screen flick phenomenon of the display panel 20.

As can be seen from FIG. 4, in the embodiments of the present disclosure, the initialization process of the TCON circuit 14 includes two phases. In the first phase, the first power circuit 131 has not output the analog power signal (AVDD) to the first display driving circuit 11, and at this time, the first display driving circuit 11 cannot send the data signals (Vdata) to the plurality of pixels P1 based on the analog power signal (AVDD). Therefore, in this phase, the timing signals (ESTV, ECB, ECK, GATEGOA, GCB, and GCK) output by the level shift circuit 111 are uncontrollable, and do not affect the display picture of the display panel. In the second phase, after the first power circuit 131 outputs the analog power signal (AVDD) to the first display driving circuit 11, the first display driving circuit 11 can control the second display driving circuit 12 according to the variation of the analog power signal (AVDD). That is, when the level of the analog power signal (AVDD) changes from the low level to the high level, since the level shift circuit 111 in the first display driving circuit 11 has not received the first driving timing signal output by the TCON circuit 14, the level shift circuit 111 is still in an abnormally operating state, and thus can send the first control signal to the second display driving circuit 12 through the first display driving circuit 11, that is, the first display driving circuit 11 can uniformly pull up the output signals from the level shift circuit 111, to control the output signals from the level shift circuit 111 to be at the high level, so that the gate control signals (GATEGOA) received by the second display driving circuit 12 are all at the high level. Therefore, the second display driving circuit 12 can receive the high-level signals, and send the turn-off signals to the plurality of pixels P1 based on the high-level signals to turn off the plurality of pixels P1.

Alternatively, the first control signal includes a gate control signal (GATEGOA) and a light emission control signal (EMGOA) received by the second display driving circuit 12, that is, the first display driving circuit 11 can control the output signals from the level shift circuit 111 to be at the high level, so that the gate control signal (GATEGOA) and the light emission control signal (EMGOA) received by the second display driving circuit 12 are at the high level. Therefore, the second display driving circuit 12 can receive the high-level signals, and send the turn-off signals to the plurality of pixels P1 based on the high-level signals to turn off the plurality of pixels P1.

Figure 5:
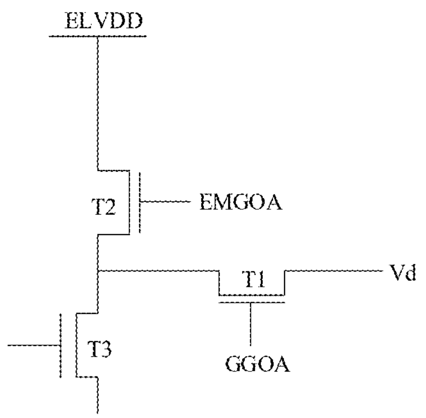
FIG. 5 is a schematic structural diagram of a pixel driving circuit according to some embodiments of the present disclosure.

FIG. 5 is a schematic structural diagram of a pixel driving circuit according to some embodiments of the present disclosure. Referring to FIG. 5, optionally, the pixel P1 includes a light-emitting element and a first transistor T1. The second display driving circuit 12 is electrically connected to the gate of the first transistor T1, the first electrode of the first transistor T1 is electrically connected to the first display driving circuit 11, and the second electrode of the first transistor T1 is electrically connected to the second power circuit 132. The first transistor T1 includes a P-type transistor. The first display driving circuit 11 may send a first control signal to the second display driving circuit 12, and the second display driving circuit 12 may apply a high level to the gate of the first transistor T1 based on a gate control signal (GateGOA, GGOA for short) to turn off the first transistor T1, such that the data signal (Vdata, Vd for short) provided by the first display driving circuit 11 and received by the first electrode of the first transistor T1 cannot be turned on, and the pixel P1 is in an off state.

In an exemplary implementation, the pixel P1 includes a second transistor T2 and another transistor T3. The second display driving circuit 12 is electrically connected to the gate of the second transistor T2, and the first electrode of the second transistor T2 is electrically connected to the second power circuit 132. The second electrode of the first transistor T1 is electrically connected to the transistor T3. The second power circuit 132 is configured to transmit a driving power signal (ELVDD) to the gate of the second transistor T2, and the second display driving circuit 12 may apply a high level to the gate of the second transistor T2 based on the light emission control signal (EMGOA) to turn off the second transistor T2. In this way, the two transistors connected to the second display driving circuit 12 are turned off, to further improve the stability of the pixels P1 in the off state.

In an optional implementation, the first transistor T1 may also include an N-type transistor, and the turn-off signal output to the first transistor T1 by the second display driving circuit 12 is at a low level.

As shown in FIG. 4, optionally, the first control signal is at the same level as the analog power signal. Since other reference signals in the display driving circuit 10 have not been completely turned on in this process, the voltage of the analog power signal that has been normally output may be used as the reference voltage of the first control signal.

Figure 6:
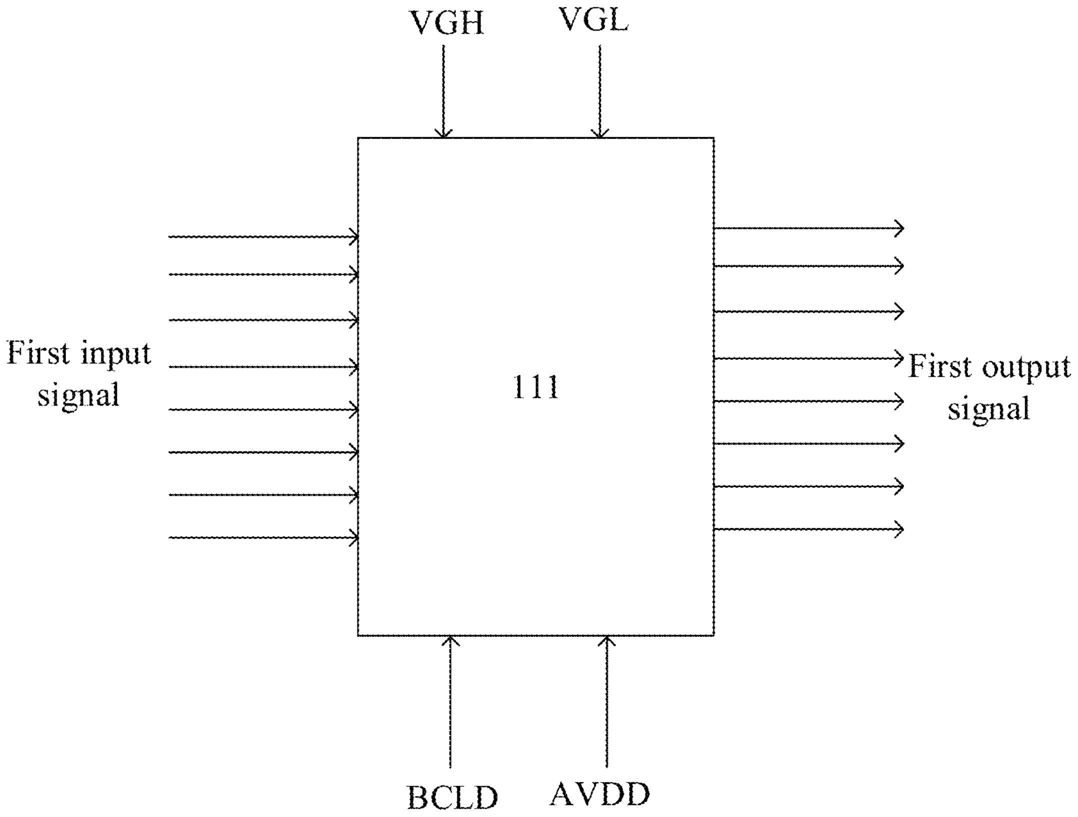
FIG. 6 is a schematic structural diagram of a level shift circuit according to some embodiments of the present disclosure.
Figure 7:
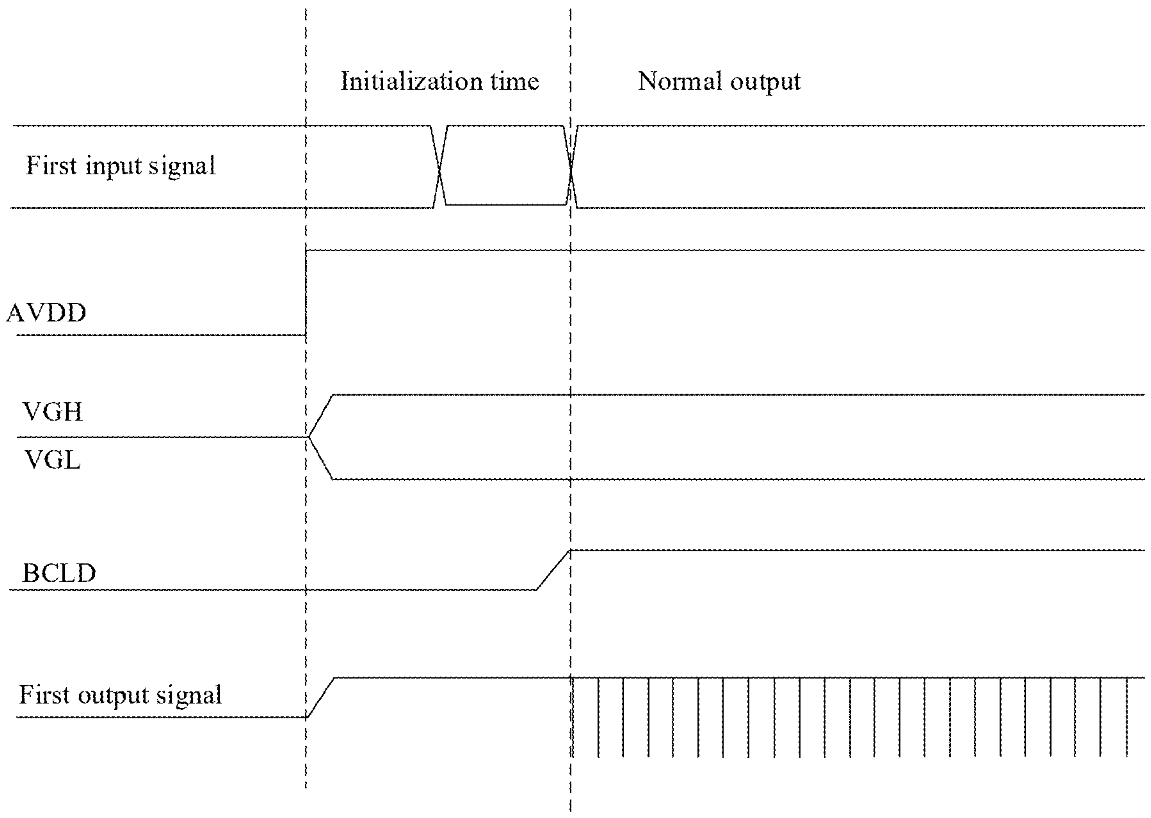
FIG. 7 is a power-on timing diagram of a level shift circuit according to some embodiments of the present disclosure.

FIG. 6 is a schematic structural diagram of a level shift circuit according to some embodiments of the present disclosure, and FIG. 7 is a power-on timing diagram of a level shift circuit according to some embodiments of the present disclosure. Referring to FIG. 6 and FIG. 7, the level shift circuit has a plurality of input signals, which include a first input signal (GPIO Input), a communication indication signal (BCLD), an analog power signal (AVDD), a high level output signal (VGH), and a low level output signal (VGL), and the level shift circuit may further have a first output signal (GPIO Output). As shown in FIG. 7, in the time period of initialization, i.e., after the level of the analog power signal (AVDD) sent by the power circuit 13 to the first display driving circuit 11 changes from the first level (low level) to the second level (high level) and before the level of the communication indication signal (BCLD) sent by the TCON circuit 14 to the first display driving circuit 11 changes to the fourth level, the first display driving circuit 11 controls the first output signal (GPIO Output) from the level shift circuit to be at the high level, that is, the level shift circuit uniformly pulls up the levels of the output signals to turn off the plurality of pixels P1 through the second display driving circuit 12. When the level of the communication indication signal (BCLD) sent by the TCON circuit 14 to the first display driving circuit 11 changes from the third level (low level) to the fourth level (high level), it indicates that the initialization of the TCON circuit 14 is completed, the TCON circuit 14 can send a normal timing control signal to the level shift circuit in the first display driving circuit 11, and the first display driving circuit 11 can control the first output signal (GPIO Output) from the level shift circuit to be the second driving timing signal. At this time, the level shift circuit starts to output normally.

That is, before the initialization of the TCON circuit 14 is completed, the first display driving circuit 11 controls the pixels P1 in the display panel 20 to remain turned off according to the power-on timing sequence, thereby avoiding abnormal display of the display panel 20.

Figure 8:
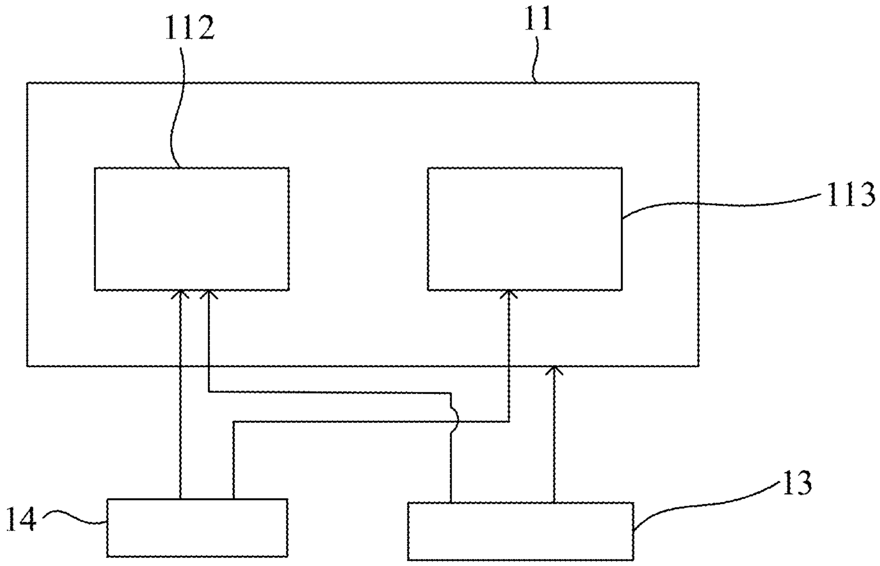
FIG. 8 is a schematic structural diagram of a first display driving circuit according to some embodiments of the present disclosure.

FIG. 8 is a schematic structural diagram of a first display driving circuit 11 according to some embodiments of the present disclosure. Referring to FIG. 8, optionally, the first display driving circuit 11 includes a comparator circuit 112 and a source driver chip 113. The comparator circuit 112 is electrically connected to the power circuit 13 and the source driver chip 113. The comparator circuit 112 is integrated in the source driver chip 113.

The comparator circuit 112 is configured to, when detecting that the level of the first power signal output by the power circuit 13 reaches the second level, generate a first indication signal and output the first indication signal to the source driver chip 113. The source driver chip 113 is configured to send a first control signal to the second display driving circuit 12 based on the first indication signal. The second level is a level when the first power signal output by the power circuit 13 is in a normal operating state. For example, when the second level reaches 8 V, the comparator circuit 112 sends the first indication signal to the source driver chip 113, so that the source driver chip 113 can respond to the variation of the first power signal output by the power circuit 13 in time.

In an optional implementation, the first display driving circuit 11 includes a comparator circuit 112 and a source driver chip 113. The comparator circuit 112 is electrically connected to the TCON circuit 14 and the source driver chip 113. The comparator circuit 112 is configured to, when detecting that the level of the communication indication signal output by the TCON circuit 14 reaches the fourth level, generate a second indication signal and output the second indication signal to the source driver chip 113. The source driver chip 113 is configured to send a second control signal to the second display driving circuit 12 based on the second indication signal. The fourth level is an indicator level when the communication between the TCON circuit 14 and the source driver chip 113 is in a normal operating state. For example, when the fourth level reaches 1.8 V, the comparator circuit 112 sends the second indication signal to the source driver chip 113, so that the source driver chip 113 can receive in time the communication indication signal indicating the initialization of the TCON circuit 14 is completed.

It should be noted that the first display driving circuit 11 may be provided with two comparator circuits 112 which are electrically connected to the power circuit 13 and the TCON circuit 14, respectively, and may also be provided with one comparator circuit 112 which is electrically connected to the power circuit 13 and the TCON circuit 14, which is not limited in the embodiments of the present disclosure.

In an optional implementation, the second level is higher than the first level, and the fourth level is higher than the third level. The first level and the third level may averagely be 0 V.

In summary, the embodiments of the present disclosure provide a display driving circuit including a first display driving circuit, a second display driving circuit, a power circuit and a TCON circuit. The first display driving circuit can turn off the plurality of pixels in the display panel through the second display driving circuit when the level of the first power signal reaches the second level; and the first display driving circuit can further drive the plurality of pixels in the display panel through the second display driving circuit when the level of the communication indication signal reaches the fourth level. In this way, when the TCON circuit is in the initialization state, the first display driving circuit can turn off the plurality of pixels through the second display driving circuit, to avoid flickering of the display panel under the control of unstable signals output from the TCON circuit. Additionally, when the TCON circuit is in the state of completing initialization, the first display driving circuit can drive the plurality of pixels through the second display driving circuit, so that the display panel normally displays. Therefore, the problem of the poor display effect of the display device in the related art can be solved, and the display effect of the display device can be improved.

Figure 9:
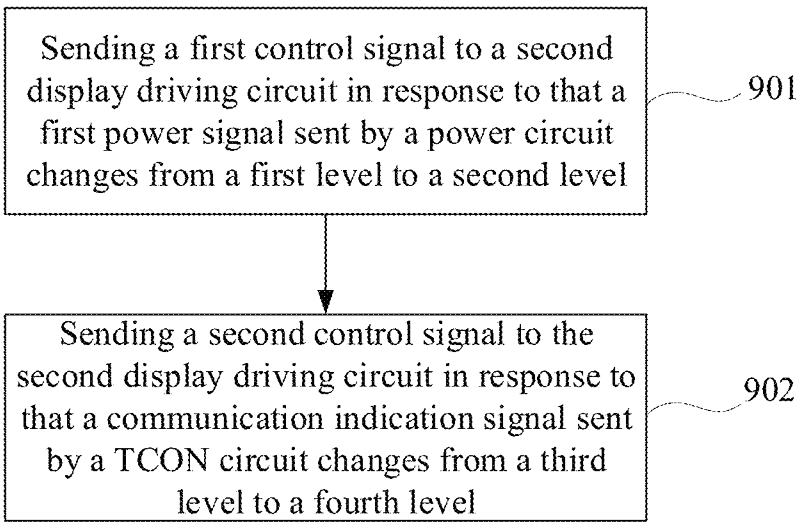
FIG. 9 is a flowchart of a method for driving a display panel according to some embodiments of the present disclosure.

FIG. 9 is a flowchart of a method for driving a display panel according to some embodiment of the present disclosure. The method is applicable to the first display driving circuit in the display driving circuit described in the foregoing embodiments. As shown in FIG. 9, the method includes the following steps.

In step 901, a first control signal is sent to a second display driving circuit in response to that a first power signal sent by a power circuit changes from a first level to a second level.

In step 902, a second control signal is sent to the second display driving circuit in response to that a communication indication signal sent by a TCON circuit changes from a third level to a fourth level.

The first control signal instructs the second display driving circuit to control the plurality of pixels to be turned off, and the second control signal instructs the second display driving circuit to drive the plurality of pixels.

In summary, the embodiments of the present disclosure provide a method for driving a display panel, applicable to the first display driving circuit in the display driving circuit. The display driving circuit includes a first display driving circuit, a second display driving circuit, a power circuit and a TCON circuit. The first display driving circuit can turn off the plurality of pixels in the display panel through the second display driving circuit when the level of the first power signal reaches the second level; and the first display driving circuit can further drive the plurality of pixels in the display panel through the second display driving circuit when the level of the communication indication signal reaches the fourth level. In this way, when the TCON circuit is in the initialization state, the first display driving circuit can turn off the plurality of pixels through the second display driving circuit, to avoid flickering of the display panel under the control of unstable signals output from the TCON circuit. Additionally, when the TCON circuit is in the state of completing initialization, the first display driving circuit can drive the plurality of pixels through the second display driving circuit, so that the display panel normally displays. Therefore, the problem of the poor display effect of the display device in the related art can be solved, and the display effect of the display device can be improved.

Figure 10:
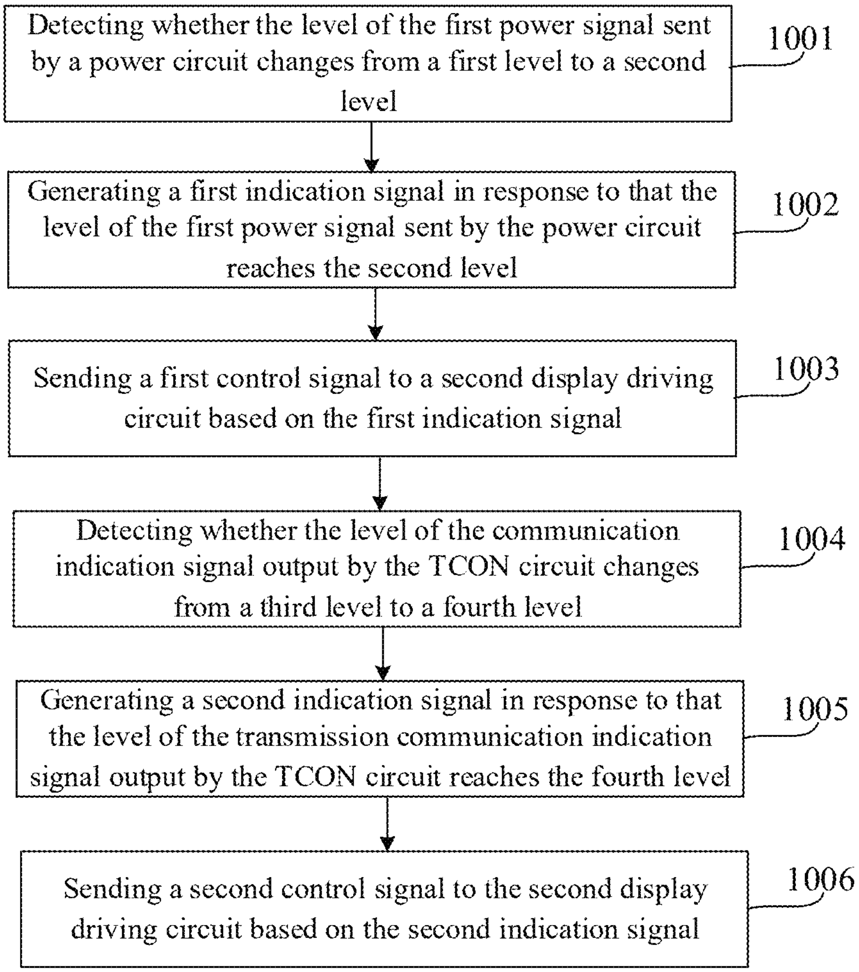
FIG. 10 is a flowchart of another method for driving a display panel according to some embodiments of the present disclosure.

FIG. 10 is a flowchart of another method for driving a display panel according to some embodiments of the present disclosure. The method is applicable to the first display driving circuit in the display driving circuit described in the foregoing embodiments. As shown in FIG. 10, the method includes the following steps.

In step 1001, it is detected whether the level of the first power signal sent by a power circuit changes from a first level to a second level.

The first display driving circuit includes a comparator circuit and a source driver chip. The comparator circuit is electrically connected to the power circuit and the source driver chip. The comparator circuit is integrated in the source driver chip. It is detected through the comparator circuit whether a level of a first power signal output by the power circuit reaches the second level.

In step 1002, a first indication signal is generated in response to that the level of the first power signal sent by the power circuit reaches the second level.

The second level is a level when the first power signal output by the power circuit is in a normal operating state. For example, when the second level reaches 8 V, the comparator circuit sends the first indication signal to the source driver chip, so that the source driver chip can respond to the variation of the first power signal output by the power circuit in time.

In step 1003, a first control signal is sent to a second display driving circuit based on the first indication signal.

The first control signal is sent to the second display driving circuit through the source driver chip based on the first indication signal. The first control signal instructs the second display driving circuit to control the plurality of pixels to be turned off.

In step 1004, it is detected whether the level of the communication indication signal output by the TCON circuit changes from a third level to a fourth level.

The first display driving circuit includes a comparator circuit and a source driver chip. The comparator circuit is electrically connected to the power circuit and the source driver chip. The comparator circuit is integrated in the source driver chip. It is detected through the comparator circuit whether the communication indication signal output by the TCON circuit reaches the fourth level.

In step 1005, a second indication signal is generated in response to that the level of the communication indication signal output by the TCON circuit reaches the fourth level.

The fourth level is an indicator level when the communication between the TCON circuit and the source driver chip is in the normal working state. For example, when the fourth level reaches 1.8 V, the comparator circuit sends the second indication signal to the source driver chip, so that the source driver chip can receive in time the communication indication signal indicating the initialization of the TCON circuit is completed.

In step 1006, a second control signal is sent to the second display driving circuit based on the second indication signal.

The second control signal is sent to the second display driving circuit through the source driver chip based on the second indication signal. The second control signal instructs the second display driving circuit to drive the plurality of pixels.

Optionally, step 1006 includes the following two steps.

(1) A first driving timing signal sent by the TCON circuit is received based on the second indication signal.

The first driving timing signal includes the configuration information of a gate driving timing signal, and the configuration information includes at least one of a duty cycle, a rising edge slope, a high level voltage value, a frequency, and signal duration.

(2) A second driving timing signal is sent to the second display driving circuit based on the first driving timing signal. The high level voltage value of the second driving timing signal is greater than the high level voltage value of the first driving timing signal.

The first display driving circuit includes a level shift circuit and a source driver chip. The level shift circuit is integrated in the source driver chip. An input terminal of the level shift circuit is electrically connected to the TCON circuit, and an output terminal of the level shift circuit is electrically connected to the second display driving circuit. The first display driving circuit increases the level of the first driving timing signal through the level shift circuit and sends the first driving timing signal to the display panel, to normally drive the display panel.

In summary, the embodiments of the present disclosure provide a method for driving a display panel, applicable to the first display driving circuit in the display driving circuit. The display driving circuit includes a first display driving circuit, a second display driving circuit, a power circuit and a TCON circuit. The first display driving circuit can turn off the plurality of pixels in the display panel through the second display driving circuit when the level of the first power signal reaches the second level; and the first display driving circuit can further drive the plurality of pixels in the display panel through the second display driving circuit when the level of the communication indication signal reaches the fourth level. In this way, when the TCON circuit is in the initialization state, the first display driving circuit can turn off the plurality of pixels through the second display driving circuit, to avoid flickering of the display panel under the control of unstable signals output from the TCON circuit. Additionally, when the TCON circuit is in the state of completing initialization, the first display driving circuit can drive the plurality of pixels through the second display driving circuit, so that the display panel normally displays. Therefore, the problem of the poor display effect of the display device in the related art can be solved, and the display effect of the display device can be improved.

Figure 11:
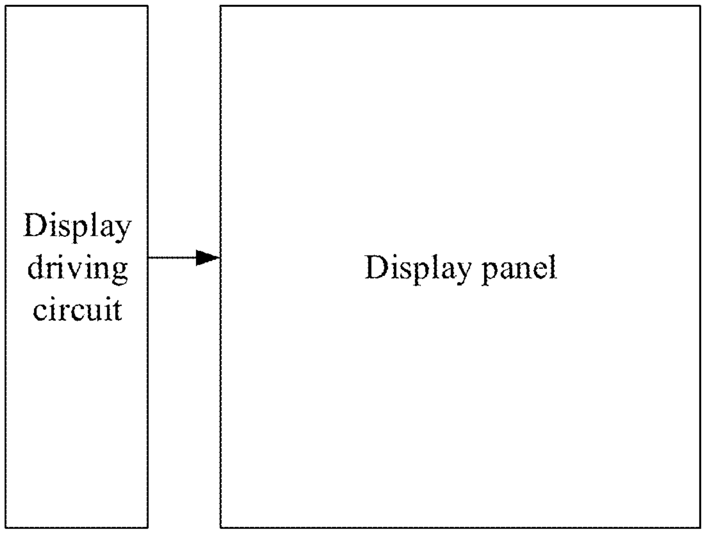
FIG. 11 is a schematic structural diagram of a display device according to some embodiments of the present disclosure.

FIG. 11 is a schematic structural diagram of a display device according to some embodiments of the present disclosure. As shown in FIG. 11, the display device includes a display panel and a display driving circuit, and the display driving circuit is electrically connected to the display panel. The display driving circuit may be the display driving circuit in any one of the foregoing embodiments.

Optionally, the display panel may be applied to any product or component having a display function such as a mobile phone, a tablet computer, a television, a display, a notebook computer, a digital photo frame, and a navigator, and for example, may be an AMOLED display panel. The display device may be any product or component having a display function such as an AMOLED display device, a mobile phone, a tablet computer, a television and a display.

According to another aspect of the present disclosure, a computer program product or a computer program is provided. The computer program product or the computer program includes computer instructions which are stored in a computer-readable storage medium. A processor of a computer device reads the computer instructions from the computer-readable storage medium, and the processor executes the computer instructions to cause the computer device to implement the method for driving the display panel described above.

In the present disclosure, the terms “first”, “second”, “third” and “fourth” are for descriptive purposes only but not to be construed as indicating or implying relative importance. The term "a plurality of" refers to two or more, unless specifically defined otherwise.

It should be understood that the device and method disclosed in the embodiments of the present disclosure may be implemented in other manners. For example, the device embodiments described above are merely illustrative. For example, the division of the units is merely a logical function division, and the units may be divided in other ways in actual implementation, for example, multiple units or components may be combined or may be integrated into another system, or some features may be ignored or not executed. In addition, the mutual coupling or direct coupling or communication connection shown or discussed may be an indirect coupling or communication connection through some interfaces, devices, or units, and may be in electrical, mechanical, or other forms.

The units described as separate components may or may not be physically separate, and components displayed as units may or may not be physical units, i.e., may be in one place, or may be distributed to multiple network units. Some or all of the units may be selected according to actual needs to achieve the purpose of the solutions of the embodiments.

It should be understood by those of ordinary skill in the art that all or parts of the steps described in the foregoing embodiments can be implemented through hardware, or through relevant hardware instructed by applications stored in a computer-readable storage medium, such as a read-only memory, a disk and a CD.

The above descriptions are merely optional embodiments of the present disclosure, and are not intended to limit the present disclosure. Any modifications, equivalent substitutions, improvements and the like made within the spirit and principles of the present disclosure shall be included within the protection scope of the present disclosure.

What is claimed is:

1. A display driving circuit, applicable to a display panel, wherein the display panel comprises a plurality of pixels, and the display driving circuit comprises: a first display driving circuit, a second display driving circuit, a power circuit and a timing controller circuit; wherein the first display driving circuit is electrically and respectively connected to the power circuit and the timing controller circuit, the power circuit is configured to send a first power signal to the first display driving circuit, and the timing controller circuit is configured to send a communication indication signal to the first display driving circuit;

the first display driving circuit is electrically connected to the second display driving circuit, and the first display driving circuit is configured to send a first control signal to the second display driving circuit in response to that a level of the first power signal changes from a first level to a second level, and send a second control signal to the second display driving circuit in response to that a level of the communication indication signal changes from a third level to a fourth level;

the second display driving circuit is electrically connected to the plurality of pixels, and the second display driving circuit is configured to: turn off the plurality of pixels in response to the first control signal so that the display panel is in a black screen state, and drive the plurality of pixels in response to the second control signal so that the display panel is in a display state.

2. The display driving circuit according to claim 1, wherein the first display driving circuit comprises a comparator circuit and a source driver chip, the comparator circuit being electrically connected to the power circuit and the source driver chip, respectively; wherein the comparator circuit is configured to generate a first indication signal and output the first indication signal to the source driver chip when detecting that the level of the first power signal output by the power circuit reaches the second level; and the source driver chip is configured to send the first control signal to the second display driving circuit based on the first indication signal.

3. The display driving circuit according to claim 1, wherein the first display driving circuit comprises a comparator circuit and a source driver chip, the comparator circuit being electrically connected to the timing controller circuit and the source driver chip, respectively; wherein the comparator circuit is configured to generate a second indication signal and output the second indication signal to the source driver chip when detecting that the level of the communication indication signal output by the timing controller circuit reaches the fourth level; and the source driver chip is configured to send the second control signal to the second display driving circuit based on the second indication signal.

4. The display driving circuit according to claim 1, wherein the timing controller circuit is further configured to send a first driving timing signal to the first display driving circuit; and the first display driving circuit is configured to: in response to that the level of the communication indication signal changes from the third level to the fourth level, stop sending the first control signal to the second display driving circuit, and send a second driving timing signal to the second display driving circuit based on the first driving timing signal, wherein a high level voltage value of the second driving timing signal is greater than a high level voltage value of the first driving timing signal, and the second driving timing signal is the second control signal.

5. The display driving circuit according to claim 1, wherein the power circuit comprises a first power circuit and a second power circuit; wherein the first power circuit is electrically connected to the first display driving circuit, the first power circuit is configured to send an analog power signal to the first display driving circuit, and the first display driving circuit is configured to send data signals to the plurality of pixels based on the analog power signal;

the second power circuit is electrically connected to the plurality of pixels, and the second power circuit is configured to send driving power signals to the plurality of pixels; and the plurality of pixels is configured to emit light based on the data signals and the driving power signals.

6. The display driving circuit according to claim 5, wherein a level of the first control signal is as same as a level of the analog power signal.

7. The display driving circuit according to claim 5, wherein the pixel comprises a light-emitting device and a first transistor; wherein the second display driving circuit is electrically connected to a gate of the first transistor, a first electrode of the first transistor is electrically connected to the first display driving circuit, and a second electrode of the first transistor is electrically connected to the second power circuit.

8. The display driving circuit according to claim 1, wherein the second level is higher than the first level, and the fourth level is higher than the third level.

9. A method for driving a display panel, wherein the display panel comprises a plurality of pixels, the method is applicable to a first display driving circuit in a display driving circuit, and the display driving circuit comprises: the first display driving circuit, a second display driving circuit, a power circuit and a timing controller circuit; wherein the first display driving circuit is electrically and respectively connected to the power circuit and the timing controller circuit, the power circuit is configured to send a first power signal to the first display driving circuit, and the timing controller circuit is configured to send a communication indication signal to the first display driving circuit;

the first display driving circuit is electrically connected to the second display driving circuit;

the second display driving circuit is electrically connected to the plurality of pixels, and the second display driving circuit is configured to: turn off the plurality of pixels in response to a first control signal so that the display panel is in a black screen state, and drive the plurality of pixels in response to a second control signal so that the display panel is in a display state; and the method comprises:

sending, by the first display driving circuit, the first control signal to the second display driving circuit in response to that a level of the first power signal changes from a first level to a second level; and sending, by the first display driving circuit, the second control signal to the second display driving circuit in response to that a level of the communication indication signal changes from a third level to a fourth level.

10. The method according to claim 9, wherein sending, by the first display driving circuit, the first control signal to the second display driving circuit in response to that the level of the first power signal changes from the first level to the second level comprises:

detecting whether the level of the first power signal sent by the power circuit changes from the first level to the second level;

generating a first indication signal in response to that the level of the first power signal sent by the power circuit reaches the second level; and sending the first control signal to the second display driving circuit based on the first indication signal.

11. The method according to claim 9, wherein sending, by the first display driving circuit, the second control signal to the second display driving circuit in response to that the level of the communication indication signal changes from the third level to the fourth level comprises:

detecting whether the level of the communication indication signal output by the timing controller circuit changes from the third level to the fourth level;

generating a second indication signal in response to that the level of the communication indication signal output by the timing controller circuit reaches the fourth level; and sending the second control signal to the second display driving circuit based on the second indication signal.

12. The method according to claim 11, wherein sending the second control signal to the second display driving circuit based on the second indication signal comprises:

receiving a first driving timing signal sent by the timing controller circuit based on the second indication signal; and sending a second driving timing signal to the second display driving circuit based on the first driving timing signal, wherein a high level voltage value of the second driving timing signal is greater than a high level voltage value of the first driving timing signal, and the second driving timing signal is the second control signal.

13. A display device, comprising: a display panel and the display driving circuit according to claim 1, wherein the display driving circuit is electrically connected to the display panel.

14. The display device according to claim 13, wherein the first display driving circuit comprises a comparator circuit and a source driver chip, the comparator circuit being electrically connected to the power circuit and the source driver chip, respectively; wherein the comparator circuit is configured to generate a first indication signal and output the first indication signal to the source driver chip when detecting that the level of the first power signal output by the power circuit reaches the second level; and the source driver chip is configured to send the first control signal to the second display driving circuit based on the first indication signal.

15. The display device according to claim 13, wherein the first display driving circuit comprises a comparator circuit and a source driver chip, the comparator circuit being electrically connected to the timing controller circuit and the source driver chip, respectively; wherein the comparator circuit is configured to generate a second indication signal and output the second indication signal to the source driver chip when detecting that the level of the communication indication signal output by the timing controller circuit reaches the fourth level; and the source driver chip is configured to send the second control signal to the second display driving circuit based on the second indication signal.

16. The display device according to claim 13, wherein the timing controller circuit is further configured to send a first driving timing signal to the first display driving circuit; and the first display driving circuit is configured to: in response to that the level of the communication indication signal changes from the third level to the fourth level, stop sending the first control signal to the second display driving circuit, and send a second driving timing signal to the second display driving circuit based on the first driving timing signal, wherein a high level voltage value of the second driving timing signal is greater than a high level voltage value of the first driving timing signal, and the second driving timing signal is the second control signal.

17. The display device according to claim 13, wherein the power circuit comprises a first power circuit and a second power circuit; wherein the first power circuit is electrically connected to the first display driving circuit, the first power circuit is configured to send an analog power signal to the first display driving circuit, and the first display driving circuit is configured to send data signals to the plurality of pixels based on the analog power signal;

the second power circuit is electrically connected to the plurality of pixels, and the second power circuit is configured to send driving power signals to the plurality of pixels; and the plurality of pixels is configured to emit light based on the data signals and the driving power signals.

18. The display device according to claim 17, wherein a level of the first control signal is as same as a level of the analog power signal.

19. The display device according to claim 17, wherein the pixel comprises a light-emitting device and a first transistor; wherein the second display driving circuit is electrically connected to a gate of the first transistor, a first electrode of the first transistor is electrically connected to the first display driving circuit, and a second electrode of the first transistor is electrically connected to the second power circuit.

20. The display device according to claim 13, wherein the second level is higher than the first level, and the fourth level is higher than the third level.

* * * * *